UNITED STATES PATENT OFFICE.

IRA LYNDE, OF MARATHON, NEW YORK.

DRYING FRUIT.

Specification forming part of Letters Patent No. 42,386, dated April 19, 1864.

*To all whom it may concern:*

Be it known that I, IRA LYNDE, of Marathon, in the county of Cortland and State of New York, have invented a new and Improved Device for Drying Fruit; and I do hereby declare that the following is a full, clear, and exact description of the same, reference being had to the accompanying drawings, making a part of this specification, in which—

Figure 1 is a side view of my invention; Fig. 2, a section of the same, taken in the line *x x*, Fig. 1.

Similar letters of reference indicate corresponding parts in the two figures.

The object of this invention is to obtain a simple and portable device for drying fruit, one which will admit of being suspended against a wall or laid in a horizontal position, or adjusted or placed in any position, and changed in position from time to time, as the facilitating of the drying process may require.

The invention consists in the employment or use of a shallow box provided with shelves, and having its sides constructed or formed of strips made of cane or other suitable material, or made of wire-cloth, so as to afford a free circulation of air through the box, as hereinafter fully shown and described.

To enable those skilled in the art to fully understand and construct my invention, I will proceed to describe it.

A represents a shallow box, which may be of square form, constructed of wood, and of any suitable dimensions. The ends or narrow sides *a* of this box are solid, but the broad sides or the top and bottom are composed of strips *b*, of cane or other suitable material, or wire-cloth or rods would answer. These open sides are designed to allow the air to pass freely through the box and the fruit contained therein.

The box is constructed with a lid, B, which may be attached by hinges *c* to the main portion, said lid being provided with cross-bars *d*, the strips *b* being attached to its inner side.

The main portion of the box A is provided with a series of shelves or partitions, *e*, placed at equal distances apart, the width of said shelves or partitions being equal to the depth of the main portion of the box, as shown in Fig. 2, and, consequently, when the lid B is closed the strips *b*, which are attached to the inner side of the lid, will abut or be in contact with the edges of the shelves or partitions, so that the main portion of the box will be divided into a series of separate or distinct compartments, having no communication with each other, as will be understood by referring to Fig. 2.

The box is filled with fruit by placing it in a horizontal position and raising the lid B. The lid is then closed and secured in a closed state by hooks *e'* or any other proper fastening. The box may then be hung up against a wall or placed in any position most favorable for drying, and it may be turned or changed in position from time to time as may be required. The open broad sides or the top and bottom of the box afford a free circulation of air through it and the fruit.

A box three feet square, and having shelves or partitions two inches in width, will hold about one bushel of apples cut in quarters. The device may be used for drying apples, berries, and other fruit.

F. A. MAXFIELD.
Fruit-Gatherer.
No. 42.387. Patented Apr. 19, 1864.
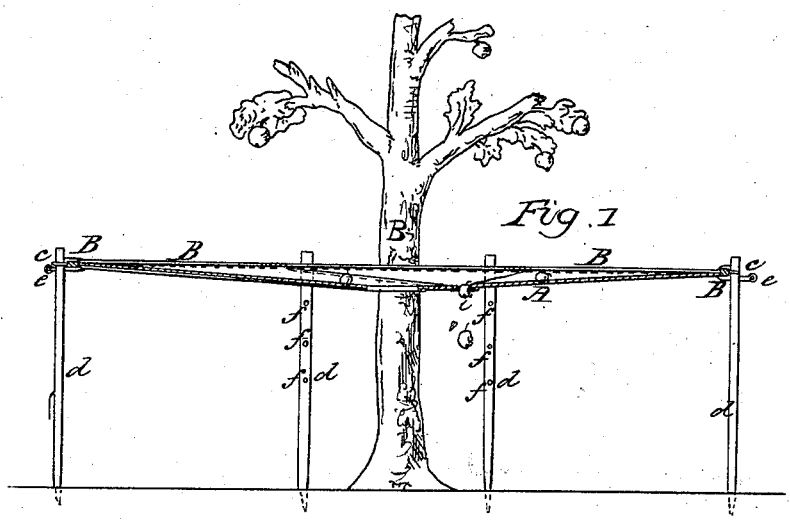
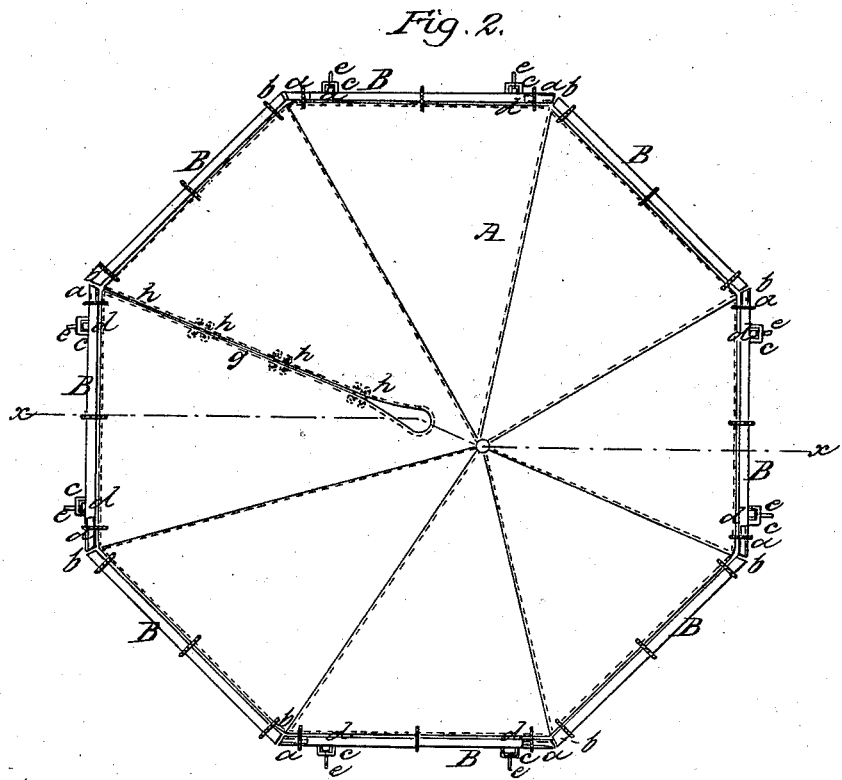

Having thus described my invention, what I claim as new, and desire to secure by Letters Patent, is—

A device for drying fruit, composed of a shallow box, A, provided with shelves or partitions *e*, and having its broad sides or top and bottom formed of strips *b*, of cane or other material, or of wire rods or wire-cloth, substantially as herein shown and described.

IRA LYNDE.

Witnesses:
WM. H. JOHNSON,
HENRY PEEBLES.